United States Patent [19]

Van der Ent

[11] 4,430,812
[45] Feb. 14, 1984

[54] ENDLESS BELT DREDGER

[75] Inventor: Arie Van der Ent, Nieuw-Lekkerland, Netherlands

[73] Assignee: IHC Holland N.V., Papendrecht, Netherlands

[21] Appl. No.: 426,183

[22] Filed: Sep. 28, 1982

[30] Foreign Application Priority Data

Nov. 5, 1981 [NL] Netherlands .................... 8105010

[51] Int. Cl.³ .................... E02F 3/08; E02F 3/14
[52] U.S. Cl. .................... 37/69; 37/191 A; 198/844
[58] Field of Search ............ 37/69, 60, 191 R, 191 A, 37/192 R, 192 A, 83; 198/844, 715, 643, 702

[56] References Cited

U.S. PATENT DOCUMENTS

| 227,988 | 5/1880 | Meech | 37/69 X |
|---|---|---|---|
| 285,565 | 9/1883 | Brotherhood | 37/69 |
| 816,958 | 4/1906 | Bouery | 37/69 |
| 2,620,575 | 12/1952 | Pace | 37/83 X |
| 3,146,537 | 9/1964 | Von Bolhar | 37/69 |
| 3,160,966 | 12/1964 | Skakel | 37/69 X |
| 3,762,558 | 10/1973 | Anderson | 37/69 X |
| 3,874,101 | 4/1975 | Cummins | 37/69 |
| 3,968,579 | 7/1976 | Rossfelder | 37/69 |

FOREIGN PATENT DOCUMENTS 285043 4/1931 Italy .................... 37/192 R

Primary Examiner—Clifford D. Crowder
Attorney, Agent, or Firm—Young & Thompson

[57] ABSTRACT

A dredging apparatus comprising a floating device and a frame suspended adjustably therein. The frame supports reversing wheels 1,2 for an endless conveying member 3 provided with blades 4 for loosening and feeding upwards the soil material. The apparatus is further provided with a chute 29 for receiving the material discharged from the members. The endless conveying member 3 comprises a closed endless belt 3 flexible in at least one direction perpendicular to its surface and provided with digging blades or partitions 4 fixed thereon. The frame is provided with a tube 9 open at top and bottom. The upwards running section of the endless belt 3 runs through the tube 9 which encloses the belt 3 with blades 4 with a small clearance. Furthermore, the frame has a part 14 projecting downwards beyond the tube and supporting a reversing wheel 2 for the belt 3. The angle of that part with respect to the vertical is adjustable such that the belt section 22 can engage the bottom at the inlet of tube 9. The downwards running section 18 extends through a tube 17 as well which has its top above water level and to which air may be supplied.

12 Claims, 3 Drawing Figures

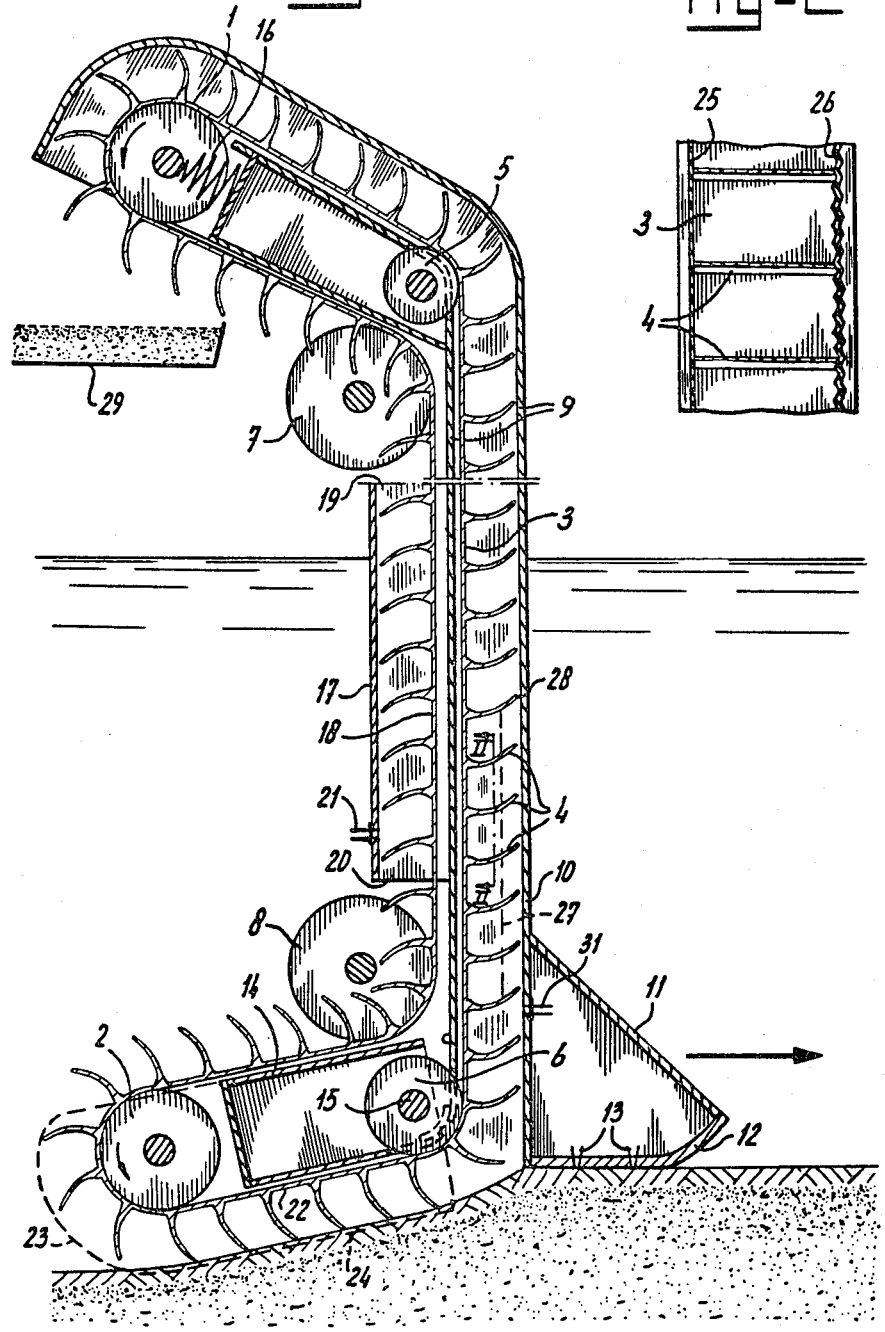
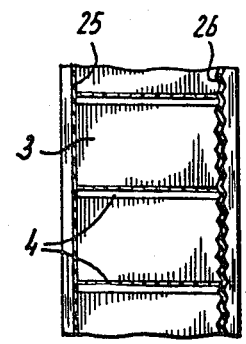

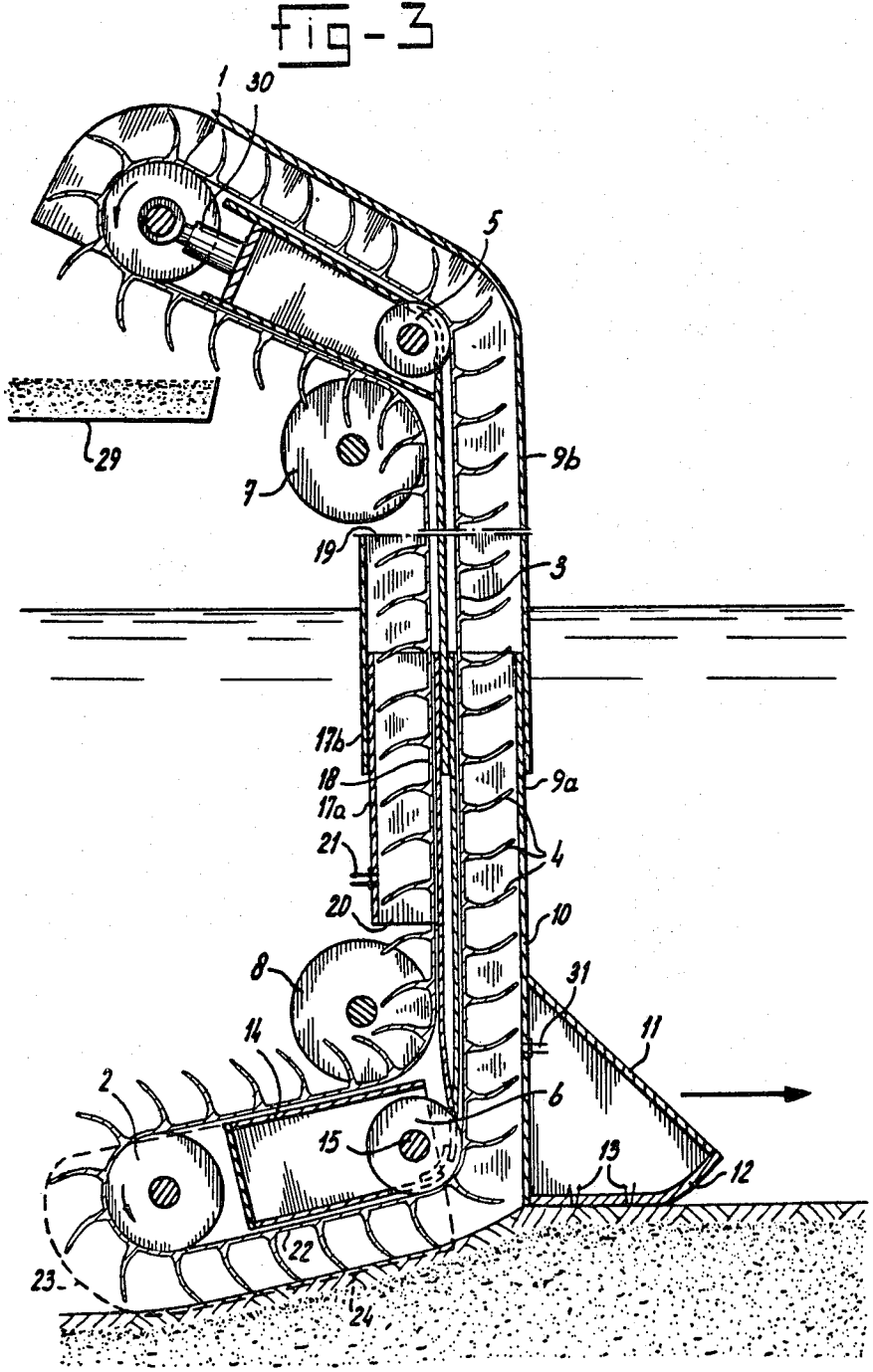

ENDLESS BELT DREDGER

The invention relates to a dredging apparatus comprising a floating device and a frame suspended adjustably therein and having reversing wheels for an endless conveying member provided with means for loosening and feeding the soil material upwards, said apparatus further being provided with means for receiving the material discharged from said members.

Such a dredging apparatus is known in the form of a bucket ladder dredger. Such dredgers have the advantage that the amount of energy per $m^3$ of dredged material is relatively low in comparison with suction dredgers sucking a mixture of ground and water, or suction dredgers provided with a rotary cutting means cutting loose the material to be dredged before the mixture of loosened material and water can be sucked up. Furthermore such bucket ladder dredgers have the advantage that they feed up the material with a high concentration of dredged material and that they are suitable for sand, clay, gravel and stone.

However, they have the disadvantage that a heavy bucket chain is necessary involving high friction forces resulting also in a high wear, while the conveying velocity is low and of the order of magnitude of 0.5 m per second. The heavy construction and the high friction forces result from the fact that the bucket chain has to dig, to raise the material and to convey it.

The object of the invention is to provide a dredging apparatus allowing a construction of a remarkably light weight and a higher feeding up capacity.

According to the invention this object is achieved in that the endless conveying member comprises a closed endless belt flexible in at least one direction perpendicular to its surface and provided with digging blades or partitions fixed thereto and the frame is provided with a tube open at top and bottom and through which the upwardly running section of the endless belt runs and embracing the belt with blades with a small clearance and the frame has a portion projecting downwardly beyond the tube and having a reversing wheel for the belt, said portion being adjustable with respect to the vertical at an angle such that the portion of the belt positioned right in front of the inlet of that tube can engage the bottom.

A flexible conveyor belt can run much more smoothly over the reversing wheels and thus, can move also more quickly. In order to loosen and to feed up the material the conveyor belt has to be provided with blades or partitions. Were they to move unprotected through the water such as the buckets of a bucket ladder dredger, then the material loosened by the blades or partitions would be washed away completely or rather completely from the blades or partitions before it could be unloaded above the water. According to the invention this disadvantage is removed in that the belt with blades or partitions runs through a tube enclosing with a small clearance the upwards running section, at least in its submerged part, but preferably up to the overflow, i.e. beyond the upper reversing wheel, whereby the material positioned on the blades or partitions cannot be washed away therefrom and can be deposited in the chute in an efficient way. Preferably, such a conveyor belt is substantially made from rubber naturally provided with a reinforcement and rubber has in wet condition a low coefficient of friction with respect to the material of the tube, usually steel. Moreover, the blades or partitions will move away from each other at the location where the belt runs over the upper reversing wheel, whereby the material held therebetween is fully released, whereas the blades converge at the location of the lower reversing wheel or wheels and thus, enclose the material.

The frame carrying the means for guiding the endless belt, as well as said feeding up tube can be adjusted into different angular positions in the same way as a bucket ladder.

Preferably however, the frame has a downwardly projecting portion pivotable about a horizontal axis with respect to the portion with the feeding up tube in order to be able to adjust said downwardly projecting portion into each desired digging angle. Preferably, said downwardly projecting portion inclines downwards and rearwards so that the digging section of the belt runs upwards and at an angle of inclination in the direction of the inlet mouth of the feeding up tube. In the digging section the downwardly projecting portion may be provided with side partitions at both sides of the belt and joining it, said partitions closing the sides of the path of the blades or partitions completely or partly.

Furthermore, one may design the conveyor belt such that the side edges of the blades are connected to each other by extensible or unfoldable side walls by which a flexible bucket shape is obtained.

Furthermore, according to the invention the downwards returning section of the belt runs with at least a portion of its submerged returning section positioned above the projecting portion, through a tube having its inlet above the water and provided with a submerged supply for pressurized air. The tube embracing that portion of the returning section has its inlet above the water. By supplying pressurized air in combination with the downwards propelling action of the blades one can obtain the result that the tube embracing the returning section is filled up with air completely or substantially completely, whereby the resistance in the returning section can be decreased substantially.

Furthermore, the belt may run over a biasing device positioned preferably at the location of the upper reversing wheel and which may be constituted by a hydraulic cylinder.

According to the invention the tube or tubes for the belt may consist of portions shiftable in a mutually telescoping relation. Then, the biasing device may also serve the adjustment of the working depth.

Furthermore, according to the invention it is preferred when seen in the direction of movement of the dredging apparatus that a fluidizing device be provided in front of the lower end of the feeding up tube. Said fluidizing device may be in any form known per se, such as water jets pulsating or not, vibrating devices, vortex devices or cutting devices.

Finally, according to the invention a connection for pressurized air may be provided on the tube of the upwards running section, preferably near the lower end of the tube. Pressurized air makes the liquid column of lighter weight and it is known to suck up ground particles by means of a tube in this way. According to the invention this principle is now combined with the feeding up of dredged material positioned on the blades of a belt. Thereby the construction may have an even lighter weight. Furthermore, the upward flow produced by the belt is supported by the rising air bubbles.

It is noted that from the Dutch Patent specification No. 153291 a digging apparatus is known operating also with an endless belt provided with blades. However, said belt conveys in the direction of the inlet mouth of a suction duct.

Furthermore, a digging apparatus is known from the published Dutch Patent Application No. 7012592 for raising mud or sludge deposited on a dry bed, in which an endless conveyor belt is used provided with catching means wiping and feeding up the sludge into a tube.

Furthermore, from the Dutch Pat. No. 65721 a trench digging machine is known operating with an endless belt provided with digging members from which the material should be discharged sideways and in which there is no tube. Such digging apparatuses are not usable under water.

Now the invention will be elucidated with reference to the drawings.

FIG. 1 shows schematically in cross section along a vertical plane the dredging apparatus according to the invention.

FIG. 2 is an enlarged section along the line II—II in FIG. 1 and shows two different embodiments of the side walls of the blades.

FIG. 3 shows a modification of the embodiment of FIG. 1.

The apparatus shown in FIG. 1 comprises a frame not shown in detail in which are supported the upper reversing wheel 1, the lower reversing wheel 2, a conveyor belt 3 and a large number of blades 4 integral therewith, as well as in engagement with the inner surface of the belt an upper guiding wheel 5 and a lower guiding wheel 6 and upper and lower guiding wheels 7 and 8 respectively engaging the edges of the belt.

Furthermore, the frame carries a tube 9 the front wall 10 of which carries with its lower end at 11 a supporting construction with guiding shoe 12, which guiding shoe may be provided with fluidizing devices such as jet nozzles 13.

The lower part 14 of the frame bearing the lower reversing wheel 2 may if desired be pivotable around the axis of the guiding wheel 6, i.e. around the axis 15, in order to give it another angle of inclination with respect to the tube 9 by means of a hydraulic cylinder not shown.

The upper reversing wheel 1 is guided in the frame and biased by a biasing device 16 indicated only schematically. This may be a hydraulic cylinder or a spring which may be put under tension.

Furthermore, the frame supports a second tube 17 for the returning section 18 of the belt 3, said tube 17 having an inlet mouth 19 above the water and near its lower end 20 positioned right above the guiding wheel 8, is provided with a pressurized air supply 21.

Furthermore, along the digging section 22 the frame may have side plates 23 indicated with dashed lines and positioned at both sides of the belt and of which the lower edge 24 may be positioned slightly lower than the extreme edges of the blades, or at the same level or slightly higher.

FIG. 2 shows that between the blades 4, side walls 25 and 26 integral with the blades and belt may be provided, which either may consist of elastically extensible material as indicated by 25, or as indicated by 26 may consist of foldable material. Their extreme edges may be spaced slightly from the extreme edges 28 of the blades as shown in FIG. 1 at 27. In this way bucket-shaped blades are created spreading at the upper reverse wheel 1 in order to stimulate the dumping into the chute 29 and confining at the lower guiding wheel 6.

In the drawing of FIG. 1 the frame is shown in a position in which the tubes stand vertical. However, angular adjustments with respect to the vertical as usual in the bucket ladder are also possible resulting by combination with the adjustable lower portion 14 in an optimization of the digging properties of the belt. In comparison to the buckets of a bucket ladder dredger, the device according to the invention may operate with relatively small blades moving with a high velocity by which a remarkably higher feeding up capacity may be obtained. The flexible rubber blades integral with the belt or fixed stationary thereon may be compliant when the blades encounter non-displaceable material such as too big stones.

The returning section 18 moving through the tube 17 performs a propelling action downwards. The inlet of said tube is positioned above the water level so that only near the lower end 20 water can enter. By the supply of pressurized air and the downwards propelling action an equilibrium may be achieved by which said tube 17 is maintained free or rather completely free from water.

The modification shown in FIG. 3 differs from that shown in FIG. 1 in that the tube 9 terminates at its upper end above the reversing wheel 1.

Furthermore, the biasing device of FIG. 3 comprises a hydraulic cylinder 30 instead of a spring 16 and the tubes 9 and 17 are telescopic such that the lower parts 9a and 17a may be shifted within the upper parts 9b and 17b. By means of the cylinder 30 the working depth of the lower portion 14 is controllable.

Finally, it is also possible to supply air into the tube 9 of the upwards running section, for example at 31. In known way, said air gives the liquid column a lighter weight and supports thereby the upwards extending portion.

I claim:

1. In dredging apparatus comprising a floating device, a frame suspended on the floating device, reversing wheels carried by the frame, an endless conveyor trained about the reversing wheels, means carried by the conveyor for loosening and feeding upwardly the marine soil, and means for receiving material discharged from an upper portion of the conveyor; the improvement in which the endless conveyor is an endless belt flexible in at least one direction perpendicular to its surface, said means carried by the conveyor comprising digging blades secured to the belt, the frame having a tube open at top and bottom and through which only an upwardly running section of the endless belt extends and which embraces only the upwardly running section of the belt and blades with a small clearance, the frame having a part projecting downwardly beyond the tube and having a reversing wheel for the belt, said part being mounted for vertical swinging movement about a horizontal axis relative to the frame so as to adjust the digging angle such that the belt that passes about said part engages the bottom to be dredged and moves marine soil into the lower end of said tube.

2. Dredging apparatus as claimed in claim 1, and said partitions at both sides of said downwardly projecting part on opposite sides of said belt and at least partly closing the sides of the paths of the blades.

3. Dredging apparatus as claimed in claim 1, in which said tube extends from a point adjacent the marine bottom to be dredged, to a point above the water level.

4. Dredging apparatus as claimed in claim 1, and a further tube open at top and bottom and having its inlet above the water and its outlet below the water and through which only a downwardly returning portion of the belt passes.

5. Dredging apparatus as claimed in claim 4, and means to supply pressurized air to the interior of a lower portion of said further tube.

6. Dredging apparatus as claimed in claim 1, and a biasing device that engages an upper said reversing wheel, said tube comprising telescoping portions shiftable relative to each other upon the actuation of said biasing device.

7. Dredging apparatus as claimed in claim 1, and extensible closure members interconnecting said blades of the endless belt and laterally closing the spaces between said blades.

8. Dredging apparatus as claimed in claim 1, and foldable side walls interconnecting said blades of the endless belt and laterally closing the spaces between said blades.

9. Dredging apparatus as claimed in claim 1, and means to supply pressurized air to the interior of said tube adjacent its lower end.

10. Dredging apparatus as claimed in claim 1, and a guiding shoe at the lower end of the tube, said guiding shoe and said downwardly projecting part of the frame extending away from the tube in opposite directions whereby the frame slides on the shoe on the marine soil to be dredged in advance of the lower end of the tube and the conveyor belt that passes about the downwardly projecting part of the frame dredges marine soil forwardly with respect to the direction of travel of the dredging apparatus into the lower end of the tube.

11. Dredging apparatus as claimed in claim 10, said downwardly projecting part of the frame extending diagonally downwardly away from said shoe.

12. Dredging apparatus as claimed in claim 10, the tips of said blades when positioned below said downwardly projecting part of the frame following a path which is disposed below and inclined upwardly toward the bottom of said shoe.

* * * * *